(12) United States Patent
Huang

(10) Patent No.: US 9,435,960 B2
(45) Date of Patent: Sep. 6, 2016

(54) OPTICAL FIBER COUPLING CONNECTOR

(71) Applicant: HON HAI PRECISION INDUSTRY CO., LTD., New Taipei (TW)

(72) Inventor: Hsin-Shun Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/532,423

(22) Filed: Nov. 4, 2014

(65) Prior Publication Data

US 2016/0070069 A1 Mar. 10, 2016

(30) Foreign Application Priority Data

Sep. 10, 2014 (TW) .............................. 103131104 A

(51) Int. Cl.
*G02B 6/32* (2006.01)
*G02B 6/38* (2006.01)
*G02B 6/42* (2006.01)

(52) U.S. Cl.
CPC .................. *G02B 6/32* (2013.01); *G02B 6/322* (2013.01); *G02B 6/3893* (2013.01); *G02B 6/4261* (2013.01)

(58) Field of Classification Search
CPC .............................. G02B 6/4261; G02B 6/322
See application file for complete search history.

(56) References Cited

U.S. PATENT DOCUMENTS

| 4,762,388 | A | * | 8/1988 | Tanaka | G02B 6/3831 385/58 |
|---|---|---|---|---|---|
| 6,135,644 | A | * | 10/2000 | Hakogi | G02B 6/4292 385/58 |
| 6,442,306 | B1 | * | 8/2002 | Dautartas | G02B 6/32 385/15 |
| 6,530,696 | B1 | * | 3/2003 | Ueda | G02B 6/3893 385/59 |
| 6,934,450 | B2 | * | 8/2005 | Hiramatsu | G02B 6/4292 385/126 |
| 7,373,031 | B2 | * | 5/2008 | Wang | G02B 6/4292 385/14 |
| 7,399,125 | B1 | * | 7/2008 | Whaley | G02B 6/4204 385/88 |
| 7,597,485 | B2 | * | 10/2009 | Moriarty | G02B 6/3855 385/76 |
| 7,614,802 | B2 | * | 11/2009 | Morioka | G02B 6/4292 385/88 |
| 8,297,856 | B2 | * | 10/2012 | Banal, Jr. | G02B 6/4292 385/135 |
| 8,414,199 | B2 | * | 4/2013 | Ishigami | G02B 6/4292 385/15 |
| 8,478,094 | B2 | * | 7/2013 | Hsu | G02B 6/4214 385/47 |
| 8,554,030 | B2 | * | 10/2013 | Noguchi | G02B 6/4204 385/14 |
| 8,827,573 | B2 | * | 9/2014 | Lin | G02B 6/4214 385/89 |
| 8,858,093 | B2 | * | 10/2014 | Kuo | G02B 6/4246 385/33 |
| 8,873,907 | B2 | * | 10/2014 | Kuo | G02B 6/4214 385/33 |
| 9,006,643 | B2 | * | 4/2015 | Lin | G02B 6/4214 250/227.11 |
| 9,054,483 | B2 | * | 6/2015 | Lin | H05K 3/303 |
| 9,146,154 | B2 | * | 9/2015 | Lin | G01J 1/0271 |
| 9,170,384 | B2 | * | 10/2015 | Lin | G02B 6/4214 |
| 9,229,176 | B2 | * | 1/2016 | Huang | G02B 6/443 |
| 2004/0114866 | A1 | * | 6/2004 | Hiramatsu | G02B 6/4292 385/39 |

(Continued)

*Primary Examiner* — Rhonda Peace
(74) *Attorney, Agent, or Firm* — Zhigang Ma

(57) ABSTRACT

An optical fiber coupling connector includes an optical coupling lens and a jumper. The optical coupling lens includes a first body having a first top surface and a connected first mounting surface, two plugs protruding from the first mounting surface, and two sliders. The first mounting surface defines two buffer gaps. Each slider is located at one side of a buffer gap away from the first body and defines an engagement groove facing away from the first body. The jumper includes a second body having a second mounting surface and two clamping arms protruding from the second mounting surface. The second mounting surface faces the first mounting surface and defines two plug holes for receiving the plugs. Each clamping arm defines a slide groove with an engagement portion protruding toward the other slide groove. Each engagement portion engages in an engagement groove.

15 Claims, 5 Drawing Sheets

(56) References Cited

U.S. PATENT DOCUMENTS

| | | | |
|---|---|---|---|
| 2006/0067631 A1* | 3/2006 | Wang | G02B 6/4292 385/92 |
| 2006/0164738 A1* | 7/2006 | Yamamoto | G02B 6/3829 359/871 |
| 2009/0154877 A1* | 6/2009 | Morioka | G02B 6/4292 385/39 |
| 2009/0154878 A1* | 6/2009 | Noguchi | G02B 6/4292 385/39 |
| 2009/0214162 A1* | 8/2009 | O'Riorden | G02B 6/3887 385/53 |
| 2011/0164851 A1* | 7/2011 | Ishigami | G02B 6/4292 385/93 |
| 2012/0148202 A1* | 6/2012 | Banal, Jr. | G02B 6/4292 385/93 |
| 2012/0155802 A1* | 6/2012 | Hsu | G02B 6/4214 385/33 |
| 2012/0189252 A1* | 7/2012 | Bhagavatula | G02B 6/32 385/79 |
| 2013/0161495 A1* | 6/2013 | Lin | G02B 6/4214 250/227.11 |
| 2013/0163924 A1* | 6/2013 | Lin | G02B 6/4214 385/33 |
| 2014/0064674 A1* | 3/2014 | Lin | G02B 6/4204 385/89 |
| 2014/0146843 A1* | 5/2014 | Lin | H05K 3/303 372/50.23 |
| 2014/0169735 A1* | 6/2014 | Kuo | G02B 6/4214 385/33 |
| 2014/0169744 A1* | 6/2014 | Kuo | G02B 6/4246 385/74 |
| 2014/0321816 A1* | 10/2014 | Wu | G02B 6/428 385/88 |
| 2014/0326906 A1* | 11/2014 | Lin | G01J 1/0271 250/578.1 |
| 2014/0341508 A1* | 11/2014 | Lin | G02B 6/4231 385/33 |
| 2015/0043868 A1* | 2/2015 | Kuo | G02B 6/4204 385/33 |
| 2015/0117816 A1* | 4/2015 | Lin | G02B 6/4214 385/33 |
| 2015/0139591 A1* | 5/2015 | Huang | G02B 6/443 385/88 |
| 2015/0153518 A1* | 6/2015 | Kuo | G02B 6/3885 385/79 |

* cited by examiner

OPTICAL FIBER COUPLING CONNECTOR

FIELD

The subject matter herein generally relates to an optical fiber coupling connector.

BACKGROUND

An optical fiber coupling connector includes an optical coupling lens and a jumper. The optical coupling lens is inserted into the jumper. A plurality of fastening members, such as screws and bolts, are used to enhance the fastening of the optical coupling lens and the jumper.

BRIEF DESCRIPTION OF THE DRAWINGS

Implementations of the present technology will now be described, by way of example only, with reference to the attached figures.

DETAILED DESCRIPTION

Figure 1:
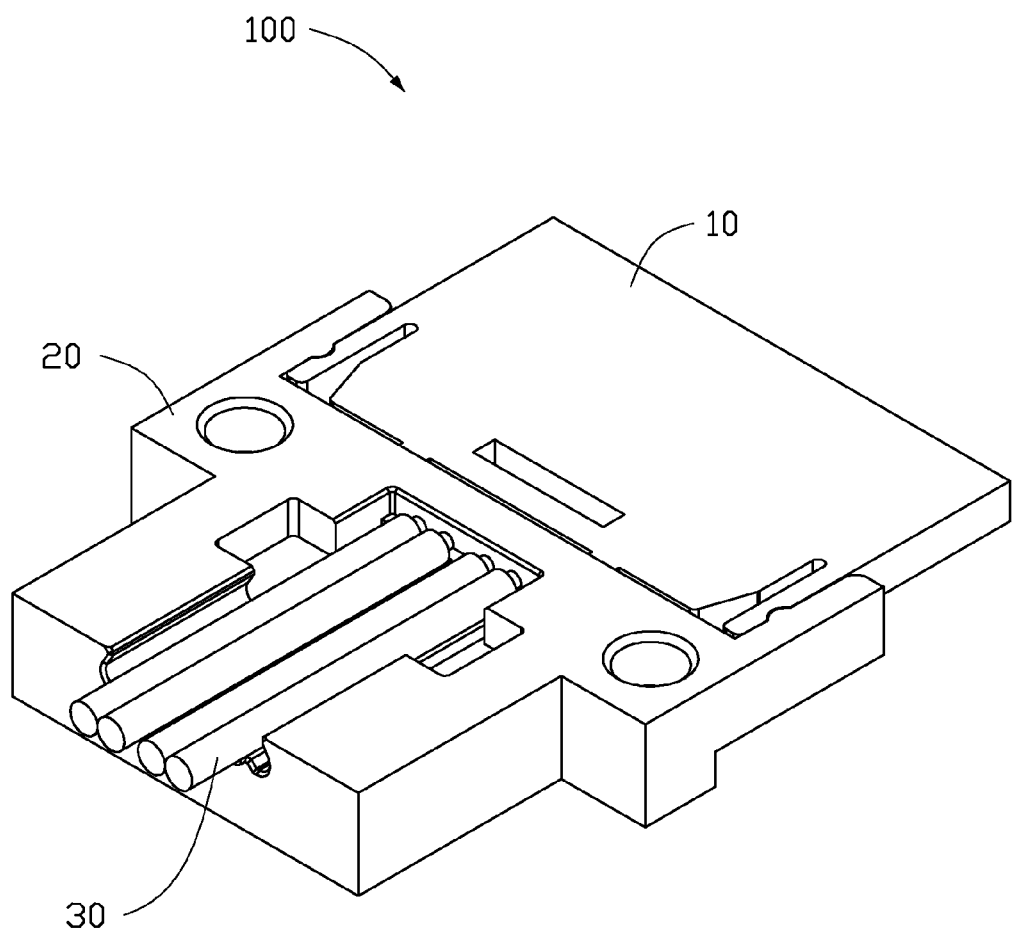
FIG. 1 is an isometric view of an embodiment of an optical fiber coupling connector, including an optical coupling lens, a jumper, and a plurality of optical fibers.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to an optical fiber coupling connector. The optical fiber coupling connector comprises an optical coupling lens and a jumper. The optical coupling lens comprises a first body, two plugs, and two sliders. The first body comprises a first top surface and a first mounting surface perpendicularly connected to the first top surface. The first mounting surface defines two buffer gaps. The plugs protrude from the first mounting surface. The plugs are located between the two buffer gaps. The sliders correspond to the buffer gaps. Each slider is located at one side of the corresponding buffer gap away from the first body. Each slider defines an engagement groove facing away from the corresponding buffer gap. The jumper is coupled with the optical coupling lens. The jumper comprises a second body and two clamping arms. The second body comprises a second mounting surface. The second mounting surface faces the first mounting surface. The second mounting surface defines two plug holes. The plug holes are configured to receiving the two plugs respectively. The clamping arms protrude from opposite sides of the second mounting surface toward the first mounting surface. Each clamping arm defines a slide groove corresponding to a slider. An engagement portion protrudes from an inner surface of each slide groove toward the other slide groove. Each engagement portion corresponds to and engages in an engagement groove.

FIG. 1 illustrates an embodiment of an optical fiber coupling connector 100. The optical fiber coupling connector 100 includes an optical coupling lens 10, a jumper 20, and a plurality of optical fibers 30.

FIGS. 1-3 and 5 illustrate that the optical coupling lens 10 includes a first body 11, two plugs 12, four first converging members 13, a protrusion 14, four second converging members 15, a supporting member 16, and two sliders 17.

Figure 2:
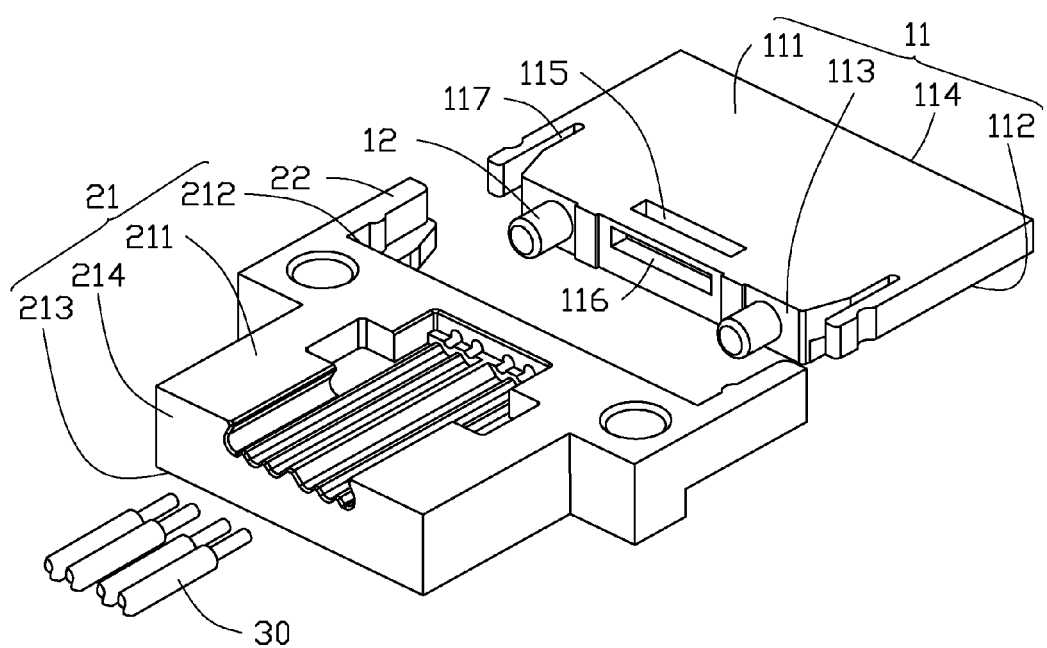
FIG. 2 is an exploded view of the optical fiber coupling connector of FIG. 1.
Figure 5:
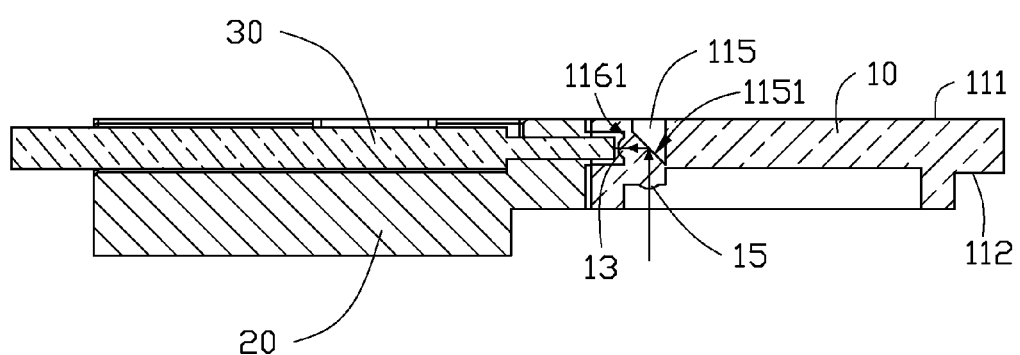
FIG. 5 is a cross-sectional view of the optical fiber coupling connector of FIG. 1 taken along a V-V line.

FIGS. 2 and 5 illustrate that the first body 11 includes a first top surface 111, a first mounting surface 113, a first bottom surface 112, and a first rear surface 114. The first top surface 111 and the first bottom surface 112 are positioned at opposite sides of the first body 11, and are substantially parallel to each other. The first mounting surface 113 and the first rear surface 114 are positioned at opposite sides of the first body 11, and are substantially parallel to each other. The mounting surface 113 is substantially perpendicularly interconnected between the first top surface 111 and the first bottom surface 112. The first mounting surface 113 extends from the first top surface 111 to the first bottom surface 112. The first top surface 111 defines a first recess 115. The first body 11 further includes an inner reflective surface 1151 at the bottom of the first recess 115. An included angle between a main plane of the first top surface 111 and a main plane of the inner reflective surface 1151 is about 45 degrees. An included angle between a main plane of the first mounting surface 113 and a main plane of the inner reflective surface 1151 is about 45 degrees. The first mounting surface 113 defines a second recess 116 and two buffer gaps 117. The second recess 116 is located at a central portion of the first mounting surface 113. The first body 11 further includes a first optical surface 1161 in the second recess 116. The first optical surface 1161 is substantially parallel to the first mounting surface 113. The first optical surface 1161 faces the inner reflective surface 1151 and is substantially perpendicular to the first top surface 111. The two buffer gaps 117 are located at opposite sides of the second recess 116. Each of the two buffer gaps 117 is defined in the first body 11 between the first top surface 111 and the first bottom surface 112, and extends substantially perpendicularly inward the first body 11 from the first mounting surface 113.

The two plugs 12 protrude substantially perpendicularly from the first mounting surface 111 toward a same direction. The two plugs 12 are located between the two buffer gaps 117 and at opposite sides of the second recess 116.

The first converging members 13 are located inside the second recess 116 and are arranged on the first optical surface 1161. In one embodiment, the first converging members 13 can be convex lenses.

Figure 3:
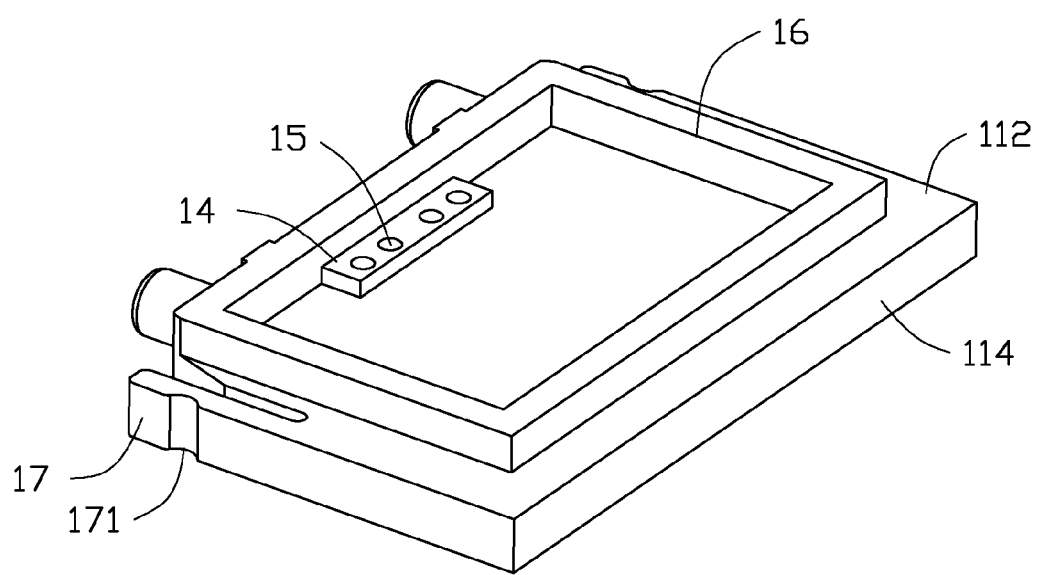
FIG. 3 is an isometric view of the optical coupling lens of FIG. 2, but viewed from another aspect.

FIG. 3 illustrates that the protrusion 14 protrudes from the first bottom surface 112 along a direction away from the first top surface 111. The protrusion 14 includes a second optical surface 141. The second optical surface 141 faces the inner reflective surface 1151. In one embodiment, the second optical surface 141 is substantially parallel to the first bottom surface 112.

The second converging members 15 are arranged on the second optical surface 141. Each second converging member 15 is optically aligned with a first converging member 13. In one embodiment, the second converging members 15 can be convex lenses.

The supporting member 16 protrudes from the first bottom surface 112 along a direction away from the first top surface 111. In one embodiment, the supporting member 16 is a substantially annular bulge. An area surrounded by the supporting member 16 is smaller than the area of the first bottom surface 112. The protrusion 14 is surrounded by the supporting member 16. In one embodiment, the protrusion 14 and the supporting member 16 form a unitary configuration.

Each slider 17 corresponds to a buffer gap 117 and is located at one side of a corresponding buffer gap 117 away from the first body 11. That is, each slider 17 is formed between a corresponding buffer gap 117 and a side surface of the first body 11, and the side surface of the first body 11 is perpendicular to the first mounting surface 113, the first top surface 111, and the first bottom surface 112. Each slider 17 defines an engagement groove 171 opposite the corresponding buffer gap 117. In one embodiment, each engagement groove 171 is substantially semi-cylindrical shaped and a central axis is substantially perpendicular to the first top surface 111.

Figure 4:
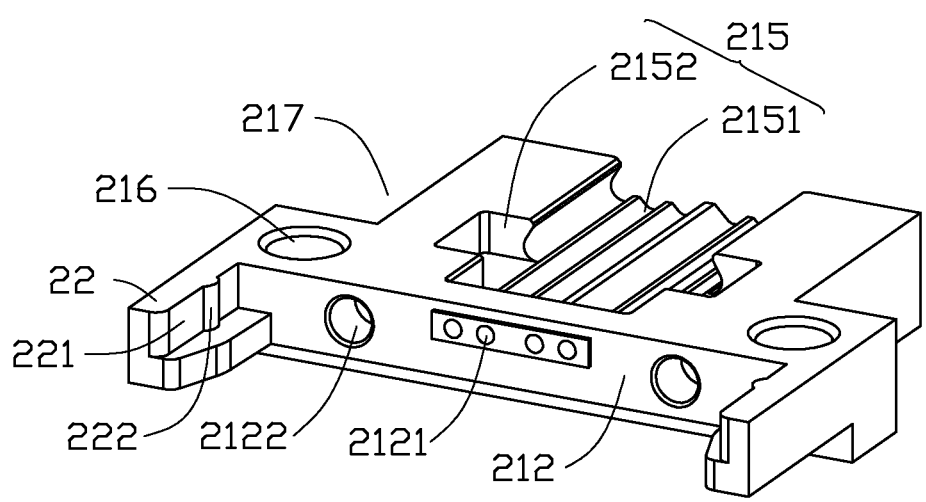
FIG. 4 is an isometric view of the jumper of FIG. 2, but viewed from another aspect.

FIGS. 1-2 and 4 illustrate that the jumper 20 includes a second body 21 and two clamping arms 22.

FIGS. 2 and 4 illustrate that the second body 21 includes a second top surface 211, a second mounting surface 212, a second bottom surface 213, and a second rear surface 214. The second top surface 211 and the second bottom surface 213 are positioned at opposite sides of the second body 21, and are substantially parallel to each other. The second mounting surface 212 and the second rear surface 214 are positioned at opposite sides of the second body 21 and are substantially parallel to each other. The second mounting surface 212 and the second rear surface 214 extend from the second top surface 211 to the second bottom surface 213. The second mounting surface 212 is substantially perpendicularly interconnected between the second top surface 211 and the second bottom surface 213. The second top surface 211 defines a receiving groove 215 and two positioning portions 216. The receiving groove 215 extends towards and passes through the second rear surface 214. A bottom of the receiving groove 215 defines four receiving gaps 2151. Two first openings 2152 are defined in the second top surface 211 at opposite sides of the receiving groove 215. The first openings 2152 are coupled with the receiving groove 215. The positioning portions 216 are located at opposite sides of the receiving groove 215.

In one embodiment, the second body 21 is substantially T shaped. Two second openings 217 are defined at opposite sides of the second body 21. Each second opening 217 corresponds to a first opening 2152 facing away from the other second opening 217. Each second opening 217 passes through the second top surface 211, the second bottom surface 213, and the second rear surface 214.

The second mounting surface 212 faces the first mounting surface 113 and defines four receiving holes 2121 located at a central portion of the second mounting surface 212. Each receiving hole 2121 corresponds to a first converging member 13. The receiving holes 2121 are coupled with the receiving groove 215 and are aligned with the receiving gaps 2151 respectively. The second mounting surface 212 also defines two plug holes 2122 located at opposite sides of the receiving holes 2121. The two plug holes 2122 correspond to the two plugs 2121. Each plug hole 2122 is configured to receive a corresponding plug 12.

The two clamping arms 22 extend substantially perpendicularly out from opposite ends of the second mounting surface 212 toward the first mounting surface 113. The two sliders 17 are engagable with the two clamping arms 22 connecting the first body 11 to the second body 21. The two clamping arms 22 are located at opposite sides of the two plug holes 2122. Each clamping arm 22 defines a slide groove 221. Each slide groove 221 faces the other slide groove 221. An engagement portion 222 protrudes from an inner surface of each slide groove 221 toward the other slide groove 221. Each engagement portion 222 corresponds to an engagement groove 171. In one embodiment, each engagement portion 222 is substantially semicylindrical.

FIGS. 1 and 2 illustrate that when in assembly, each slider 17 slides along a corresponding slide groove 221. Each plug 12 is inserted into a corresponding plug hole 2122. Each engagement portion 222 engages in a corresponding engagement groove 171, and is secured in the corresponding engagement groove 171. The optical fibers 30 are received in the receiving gaps 2151 respectively. Each optical fiber 30 passes through a receiving hole 2121 corresponding to the receiving gap 2151 and extends into the second recess 116. Each optical fiber 30 is aligned with a first converging member 13.

FIG. 5 illustrates that when working, light reaching the second converging members 15 converges into parallel light. The parallel light enters the optical coupling lens 10 through the second converging members 15 toward the inner reflective surface 1151. The parallel light is reflected by the inner reflective surface 1151 toward the corresponding first converging members 13. The parallel light emits out of the optical coupling lens 10 through the first converging members 13 toward the aligned optical fibers 30.

The embodiments shown and described above are only examples. Many details are often found in the art such as the other features of an optical fiber coupling connector. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. An optical fiber coupling connector comprising:
an optical coupling lens comprising a first body, two plugs, and two sliders, the first body comprising a first top surface and a first mounting surface perpendicularly connected to the first top surface, the first mounting surface defining two buffer gaps, the plugs protruding from the first mounting surface and located between the two buffer gaps, the sliders corresponding to the buffer gaps, each slider being located at one side of the corresponding buffer gap away from the first body, each slider defining an engagement groove facing away from the corresponding buffer gap; and
a jumper connectable to the optical coupling lens, comprising a second body and two clamping arms, the second body comprising a second mounting surface entirely facing the first mounting surface, the second mounting surface defining two plug holes configured to receive the two plugs respectively, the clamping arms located at opposite sides of the second mounting surface and connected to the second mounting surface directly, the clamping arms protruding from the second mounting surface toward the first mounting surface, each clamping arm defining a slide groove corresponding to a slider, an engagement portion protruding from an inner surface of each slide groove toward the other slide groove, and each engagement portion engaging in an engagement groove connecting the jumper to the optical coupling lens.

2. The optical fiber coupling connector of claim 1, wherein the first top surface defines a first recess, the first body further comprises an inner reflective surface at the bottom of the first recess.

3. The optical fiber coupling connector of claim 2, wherein an included angle between a main plane of the inner reflective surface and a main plane of the first top surface is about 45 degrees, and an included angle between a main plane of the inner reflective surface and a main plane of the first mounting surface is about 45 degrees.

4. The optical fiber coupling connector of claim 2, wherein the first mounting surface defines a second recess located at a central portion of the first mounting surface, the second recess is located between the two plugs, and the first body further comprises a first optical surface in the second recess, the first optical surface faces the inner reflective surface.

5. The optical fiber coupling connector of claim 4, wherein the optical coupling lens further comprises a plurality of first converging members, and the first converging members are located inside the second recess and are arranged on the first optical surface.

6. The optical fiber coupling connector of claim 5, wherein the first body further comprises a first bottom surface and a first rear surface, the first top surface and the first bottom surface are positioned at opposite sides of the first body and are parallel to each other, and the first mounting surface and the first rear surface are positioned at opposite sides of the first body and are parallel to each other.

7. The optical fiber coupling connector of claim 6, wherein the optical coupling lens further comprises a plurality of second converging members, the second converging members are located at the first bottom surface, and the second converging members face the inner reflective surface and correspond to the first converging members respectively.

8. The optical fiber coupling connector of claim 7, wherein the optical coupling lens further comprises a protrusion, the protrusion protrudes from the first bottom surface, the protrusion comprises a second optical surface, the second optical surface faces the inner reflective surface, and the second converging members are arranged on the second optical surface.

9. The optical fiber coupling connector of claim 7, wherein the optical coupling lens further comprises a supporting member, and the supporting member protrudes from the first bottom surface along a direction away from the first top surface.

10. The optical fiber coupling connector of claim 9, wherein the supporting member is a annular bulge, and the protrusion is surrounded by the supporting member.

11. The optical fiber coupling connector of claim 5, wherein the second mounting surface defines a plurality of receiving holes, the receiving holes correspond to the first converging members respectively, and the receiving holes are located between the two plug holes.

12. The optical fiber coupling connector of claim 11, wherein the second body comprises a second top surface perpendicularly connected to the second mounting surface, the second top surface defines a receiving groove, and the receiving groove is coupled with the receiving holes.

13. The optical fiber coupling connector of claim 12, wherein a plurality of receiving gaps are defined at the bottom of the receiving groove, and the receiving gaps are aligned with the receiving holes respectively.

14. The optical fiber coupling connector of claim 13, wherein two first openings are defined in the second top surface at opposite sides of the receiving groove, and the first openings are coupled with the receiving groove.

15. The optical fiber coupling connector of claim 14, wherein the second body further comprises a second bottom surface and a second rear surface, the second top surface and the second bottom surface are positioned at opposite sides of the second body and parallel to each other, the second mounting surface and the second rear surface are positioned at opposite sides of the second body and are parallel to each other, two second openings are defined at opposite sides of the second body, and the second openings pass through the second top surface, the second bottom surface, and the second rear surface.

* * * * *